United States Patent [19]

Haws

[11] 4,321,943
[45] Mar. 30, 1982

[54] AUTOMATIC HOT WATER RECOVERY SYSTEM

[76] Inventor: Spencer K. Haws, P.O. Box 315, Mesa, Wash. 99343

[21] Appl. No.: 124,491

[22] Filed: Feb. 25, 1980

[51] Int. Cl.³ .......................... F16K 49/00; F24H 1/00
[52] U.S. Cl. ..................................... 137/337; 126/362
[58] Field of Search ......................... 126/362; 137/337; 122/17

[56] References Cited

U.S. PATENT DOCUMENTS

| | | | |
|---|---|---|---|
| 1,108,550 | 8/1914 | Chubb | 137/337 |
| 1,247,374 | 11/1917 | Chubb | 137/337 |
| 2,842,155 | 7/1958 | Peters | 137/337 |
| 3,741,195 | 6/1973 | Ellis | 126/362 |
| 3,799,181 | 3/1974 | Maddren | 137/337 |
| 3,941,118 | 3/1976 | Schutte | 126/362 |

*Primary Examiner*—A. Michael Chambers
*Attorney, Agent, or Firm*—Townsend and Townsend

[57] ABSTRACT

Heat in the hot water lines of a water system is automatically recovered by providing a bridge conduit between the cold water lines and the hot water lines and by depressurizing the hot water lines relative to the cold water lines thereby to automatically direct higher pressure cold water into the hot water lines through the interconnection, which preferably is located near the hot water outlet. The higher pressure cold water forces the hot water back into the storage tank and out of the hot water lines until pressure is equalized. Loss of unused heat trapped in the hot water lines is minimized thereby saving energy.

9 Claims, 2 Drawing Figures

AUTOMATIC HOT WATER RECOVERY SYSTEM

BACKGROUND OF THE INVENTION

1. Field of Invention

This invention relates to energy conservation and particularly to the recovery of normally unused heat in hot water lines of a domestic water system.

It is very common for the water system in a typical home to waste ten to twenty-five gallons of hot water each day or as much as about nine thousand gallons per year. It is estimated that one ounce of heating oil or one cubic foot of natural gas or 250 watt-hours of electricity is consumed for every gallon of water heated for domestic consumption. Using energy costs at the end of 1979, conservation of ten to twenty-five gallons of hot water per day could save a typical household about forty dollars to one hundred dollars per year. Skyrocketing energy costs and the need to conserve energy from both the domestic and national perspective are compelling reasons to minimize the waste in heating water.

A gallon of water is trapped in thirty-six feet of three-quarter inch pipe or in sixty-three feet of one-half inch pipe. The heat in trapped water in the length of pipe between the hot water outlet and the water heater tank is typically lost by heat transfer to the pipe and thereafter to the atmosphere and also by the practice of draining water from the pipe until the outlet temperature stabilizes. Hence, both heat and water are wasted in a typical domestic hot water system. What is needed therefore is a technique and device for eliminating the source of heat loss in the hot water lines.

2. Description of the Prior Art

The most common technique for minimizing heat loss in hot water lines is to insulate the lines. While helpful, insulation is not totally effective. Heat is still lost, only more slowly, from trapped water. After an hour or so, depending upon the amount of insulation, most of the usable heat is typically lost.

Systems are known for making hot water instantly available and for inhibiting the freezing of hot water in pipes. One example is U.S. Pat. No. 1,247,374. In that patent, a thermal siphon is employed to force hot water through a bridge conduit into the cold water lines. When there is reverse flow, it is always in a direction forcing the cold water back into its mains. Thus, the teachings of this art urge energy waste in order to accomplish a purpose which wholly fails to address the problems addressed and solved by the present invention.

SUMMARY OF THE INVENTION

According to the invention, a pressure reducer is provided at the inlet of the hot water reservoir to assure that the pressure in the hot water lines is less than the pressure in the cold water lines and a flow restricting bridge conduit is provided between the hot and cold water lines near the hot water outlet. In operation, heat in the hot water lines, including the heat stored in the piping material, is recovered by directing higher pressure cold water into the hot water line through the bridge conduit. The higher pressure cold water forces the normally trapped hot water out of the hot water line and back into the storage tank.

Back flow continues until the pressure in the hot and cold water lines is equalized. The water tank is designed to provide air space which is of sufficient volume to be displaced by at least all of the water in the hot water line. The combination of the pressure reducing device, the bridge connection and the air space assure automatic recovery of unused heat to the hot water tank thereby to minimize energy loss.

The invention will be better understood by reference to following detailed description viewed in connection with the accompanying drawings.

BRIEF DESCRIPTION OF THE DRAWINGS

In the drawings and the following description, identical numerals refer to corresponding features and elements.

DESCRIPTION OF SPECIFIC EMBODIMENTS

Figure 1:
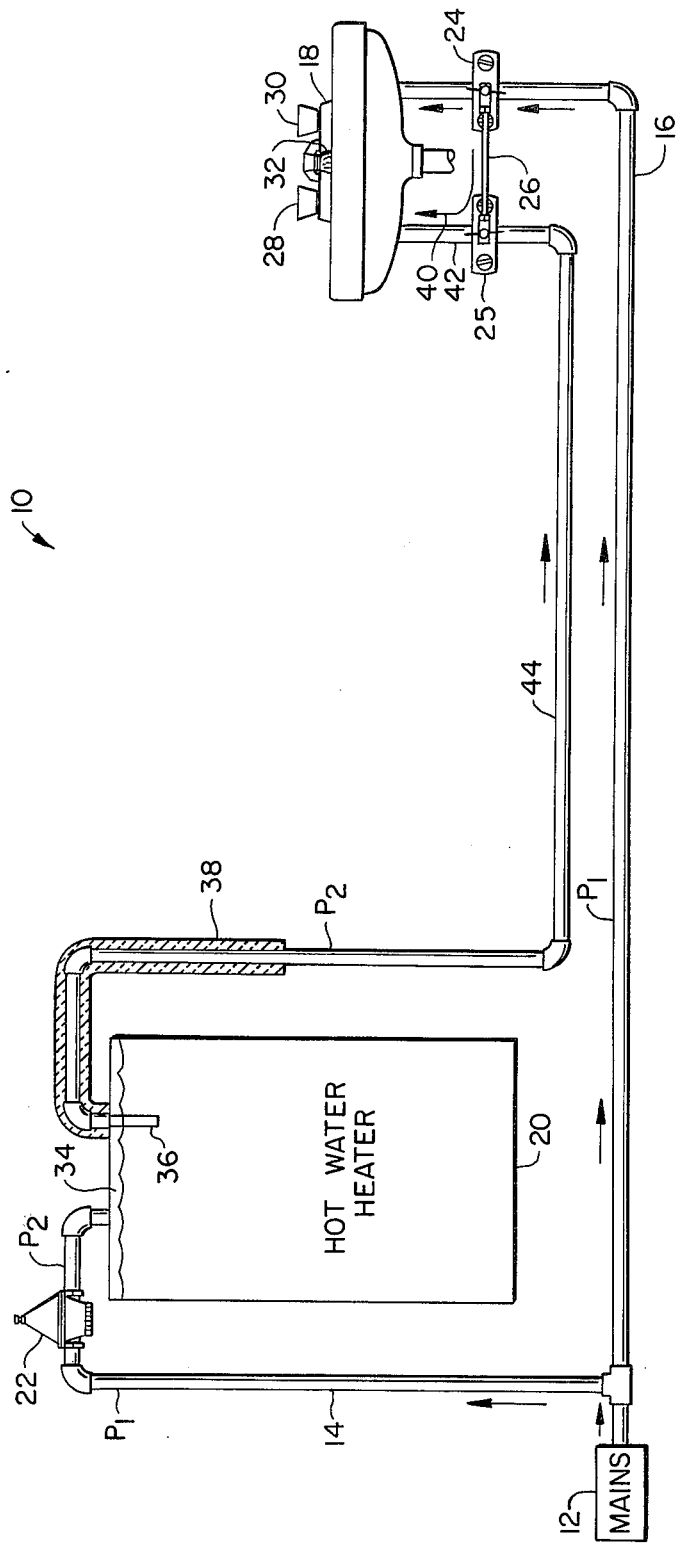
FIG. 1 is a diagrammatic illustration of a domestic hot water system according to the invention wherein the system is in normal use.

A hot water recovery system 10 according to the invention is shown in FIG. 1. The system 10 includes cold water inlet lines 14, 16 coupled to pressurized water mains 12. The inlet line 16 is coupled to an outlet fixture 18 having a cold water outlet valve fixture 30. The inlet line 14 is coupled to a hot water reservoir and heater 20 through a pressure reducer 22. The hot water heater 20 has a sealed water chamber so that the interior can be pressurized. The hot water reservoir has an outlet a line 44 having an inlet orifice 36 at a selected distance from the top of the chamber of the water heater 20. In this manner an air space 34 is provided at the top of the chamber. At zero gauge pressure, the air space 34 has its lower level at the inlet orifice 36. The hot water line 44 is preferably wrapped with insulation 38, particularly in the first three feet of its length from the inlet orifice 36, for the reasons explained hereafter.

According to the invention, a small bridge connection or tube 26 is provided between a tap 24 into the cold water line 16 and a tap 25 into the hot water line 44. A short line 42 couples the hot water tap 25 to the hot water outlet fixture 28.

The invention operates as follows. With reference, to FIG. 1, when water 32 flows from the outlet fixture 18 through both the hot water line 44 and the cold water line 16, the pressure $P_2$ on the hot water side of the pressure reducer 22 is decreased until a differential pressure exists between the mains pressure $P_1$ in line 16 and the hot water line pressure $P_2$. Hot water is conveyed from the water heater 20 to the outlet fixture 18, heating material in the hot water line 44, particularly near the inlet 36, which is wrapped in insulation 38.

Due to the pressure differential, some cold water flows from the cold water line 16 into mixture with the hot water in line 42 through tube 26 along path 40. This premixture reduces the likelihood that hot water will accidentally scald a user.

Figure 2:
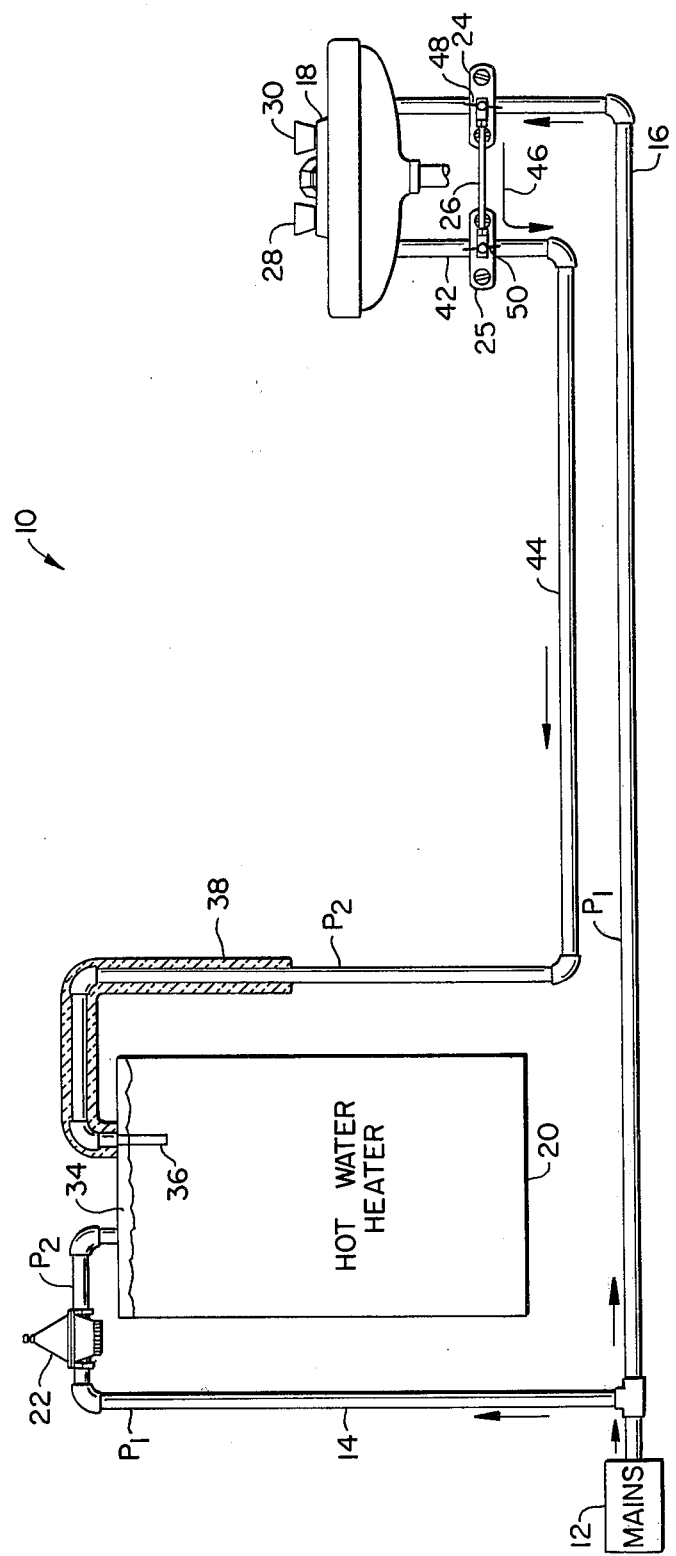
FIG. 2 is a diagrammatic illustration of a domestic water system according to the invention in standby operation, illustrating water flow according to the invention.

Turning now to FIG. 2, when the hot water outlet fixture 28 is shut off, the pressure differential $P_1-P_2$ allows the cold water trickling through the tube 26 to force the hot water back through line 44 to the hot water heater 20, as indicated by path 46. Water flow continues in this direction until the hot water pressure $P_2$ is equalized to the pressure $P_1$ of the water mains 12 by compression of the air space 34. The cooler water draws heat from the material of the hot water line. In this manner, heat from the material in the hot water line as well as the heated water is recovered and not otherwise trapped in the hot water lines. Moreover, substantially all of the heat stored in the material of the hot water line 44 under the insulated portion 38 is recovered into the water heater 20.

The preferred maximum pressure differential $P_1-P_2$, preset by the pressure reducer 22, can be determined using the volume and pressure relationship of the gas law of physics taking into account the volume of the line to be exhausted and the volume of the maximum air space 34 available in the water heater 20. For example, it is preferred that the pressure be equalized after a volume back flow exceeding the volume of the hot water line by about one-half gallon or fifty percent. In this manner, substantially all trapped heat stored in the material of the hot water line 44 is recovered for storage in the water heater 20. It is estimated that the residual heat in the material of the hot water line 44 represents as much as forty percent of the heat which is recoverable.

Various refinements on the invention enhance its adaptability to individual tastes and needs. For example, the respective taps 24, 25 may include means for adjusting flow rate through the tube 26, such as valves 48, 50. These valves 48, 50, together with the pressure reducer 22 and the air space 34 control the pressure differential, the rate at which hot water is recovered, and the volume of hot water which is recovered.

A pressure drop in the cold water line 16 may occur when the cold water outlet fixture 30 is fully opened after the hot water line 44 has been equalized to the mains pressure $P_1$. Under such circumstances, a small amount of hot water may cross flow into the cold water line 16 through the tube 26. While this will occur only until the hot water pressure $P_2$ equalizes with the reduced cold water line pressure and is not considered to be significant, this occurrence can be prevented by use of a one-way valve in the tube 26 oriented to inhibit such cross flow.

The invention has now been explained with reference to specific embodiments. Other embodiments will be suggested to those skilled in the art. For example, a similar embodiment may be employed in a utility hookup such as for a washing machine or dishwasher. Therefore, the invention should not be limited except as indicated by the appended claims based on reasonable interpretation of this specification.

What is claimed is:

1. In a plumbing system having a first cold water inlet conduit coupled to a pressurized water main, a hot water reservoir coupled to said first cold water inlet conduit, a hot water conduit coupled between said reservoir and a first outlet means and a second cold water conduit coupled between said pressurized water main and a second outlet means, an apparatus for recovering heat in said hot water conduit to said hot water reservoir comprising:

pressure reducing means coupled between said pressurized water main and said hot water reservoir in said first cold water conduit for establishing a pressure differential between hot water in said hot water conduit and cold water in said second cold water conduit such that the pressure in said hot water conduit is less than the pressure in said second cold water conduit;

bridge conduit means coupling said second cold water conduit and said hot water conduit adjacent said first and second outlet means for allowing introduction of cold water into said hot water conduit; and wherein said hot water reservoir defines means including an air space for accumulating pressure such that water presssure from said cold water conduit urges water in said hot water conduit toward said hot water reservoir whenever said first outlet means is closed and water pressure in said second cold water conduit exceeds water pressure in said hot water conduit.

2. The apparatus according to claim 1 wherein said bridge conduit means includes means for constricting fluid flow between said hot water conduit and said second cold water conduit.

3. The apparatus according to claim 2 wherein said bridge conduit means further includes means for adjusting the constriction of said constricting means.

4. The apparatus according to claim 2 further wherein said pressure reducing means includes means for adjusting the pressure differential between said cold water conduit and said hot water conduit.

5. The apparatus according to claim 1 wherein said pressure accumulating means further includes means for presetting liquid capacity to a volume at least as great as the fluid capacity of said hot water conduit.

6. The apparatus according to claim 5 wherein said capacity presetting means comprises a reservoir outlet conduit coupled to said hot water conduit having an orifice at a preset level below the top of said hot water reservoir, said reservoir being sealed except for said first cold water inlet conduit and said reservoir outlet conduit.

7. The apparatus according to claim 5 wherein said presetting means is preset to a liquid capacity greater than said hot water conduit fluid capacity such that heat retained in the material of said hot water conduit can be recovered.

8. The apparatus according to claim 5 further including means for insulating said hot water conduit for maximizing heat retention and recovery in said hot water and the material in said hot water conduit.

9. The apparatus according to claim 8 wherein said insulating means comprises a wrapping along said hot water conduit concentrated adjacent said hot water reservoir.

* * * * *